United States Patent
Pawar et al.

(10) Patent No.: US 10,904,771 B1
(45) Date of Patent: *Jan. 26, 2021

(54) METHOD AND APPARATUS FOR INVOKING BEAMFORMING RESPONSIVE TO CARRIER TRANSITION

(71) Applicant: Sprint Spectrum L.P., Overland Park, KS (US)

(72) Inventors: Hemanth B. Pawar, Brambleton, VA (US); Shilpa Kowdley Srinivas, Brambleton, VA (US); Krishna Sitaram, Chantilly, VA (US); Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/420,712

(22) Filed: May 23, 2019

Related U.S. Application Data

(63) Continuation of application No. 14/844,688, filed on Sep. 3, 2015, now Pat. No. 10,356,631.

(51) Int. Cl.
| | |
|---|---|
| *H04W 16/28* | (2009.01) |
| *H04L 5/00* | (2006.01) |
| *H04L 5/14* | (2006.01) |
| *H04W 72/04* | (2009.01) |
| *H04W 88/08* | (2009.01) |

(52) U.S. Cl.
CPC ............ *H04W 16/28* (2013.01); *H04L 5/0048* (2013.01); *H04L 5/14* (2013.01); *H04W 72/042* (2013.01); *H04W 72/0453* (2013.01); *H04W 88/08* (2013.01)

(58) Field of Classification Search
CPC ..... H04W 72/04; H04W 88/08; H04W 88/16; H04W 88/02
See application file for complete search history.

(56) References Cited

U.S. PATENT DOCUMENTS

| | | | |
|---|---|---|---|
| 2007/0248043 A1 | 10/2007 | Afrashteh et al. | |
| 2015/0146588 A1* | 5/2015 | Park | H04W 72/042 370/280 |
| 2016/0087877 A1* | 3/2016 | Ryu | H04W 76/16 370/329 |
| 2016/0198474 A1 | 7/2016 | Raghavan et al. | |

* cited by examiner

*Primary Examiner* — Peter Chen
*Assistant Examiner* — Jeff Banthrongsack

(57) ABSTRACT

Disclosed herein is a method and corresponding apparatus to help manage wireless communication between a base station and a device served by the base. In accordance with the disclosure, when a base station transitions from serving the device on just a first carrier to serving the device on a combination of the first carrier and a second carrier, the base station will responsively take action to improve downlink communication to the device on the first carrier. In particular, the base station will respond to the occurrence of that transition by starting to beamform downlink transmission to the device on the first carrier.

15 Claims, 5 Drawing Sheets

METHOD AND APPARATUS FOR INVOKING BEAMFORMING RESPONSIVE TO CARRIER TRANSITION

REFERENCE TO RELATED APPLICATION

This is a continuation of U.S. patent application Ser. No. 14/844,688, filed Sep. 3, 2015, the entirety of which is hereby incorporated by reference.

BACKGROUND

Unless otherwise indicated herein, the description provided in this section is not itself prior art to the claims and is not admitted to be prior art by inclusion in this section.

A typical cellular wireless network includes a number of base stations each radiating to provide coverage in which to serve user equipment devices (UEs) such as cell phones, tablet computers, tracking devices, embedded wireless modules, and other wirelessly equipped communication devices. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Further, a cellular wireless network may operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1×RTT and 1×EV-DO), and Global System for Mobile Communications (GSM), among others. Each protocol may define its own procedures for registration of UEs, initiation of communications, handover between coverage areas, and other functions related to air interface communication.

In practice, a base station may be configured to provide service on multiple carrier frequencies or "carriers." Each carrier could be a time division duplex (TDD) carrier that defines a single frequency channel multiplexed over time between downlink and uplink use, or a frequency division duplex (FDD) carrier that defines two separate frequency channels, one for downlink communication and one for uplink communication. Each frequency channel of a carrier may then occupy a particular frequency bandwidth defining a range of frequency at a particular position (e.g., defined by a center frequency) in the radio frequency spectrum. As such, carriers may differ in width from each other and reside at different frequencies than each other. For instance, industry standards define certain TDD carriers to be 20 MHz wide and to reside in the relatively high 2.5 GHz frequency band, and certain FDD carriers to be 5 or 10 MHz wide (per channel) and to reside in the relatively low 800 MHz frequency band. Other examples exist as well.

Each carrier may also define various logical channels to facilitate communication between the base station and one or more served UEs. For instance, on the downlink, a carrier may define a reference channel on which the base station broadcasts a reference signal useable by UEs to detect and evaluate coverage, various other downlink control channels to carry control signaling (such as resource-scheduling directives) to UEs, and one or more shared or traffic channels for carrying bearer data (e.g., user or application level data) to UEs. And on the uplink, a carrier may define one or more uplink control channels to carry control signaling (such as resource scheduling requests, channel state reports, and the like) from UEs, and one or more shared or traffic channels for carrying bearer data from UEs.

When a UE enters into coverage of a base station on a particular carrier, the UE may attach or register with the base station on that carrier, and the base station may then serve the UE on that carrier. Further, under certain air interface protocols, a base station may be able to serve a UE concurrently on multiple carriers, to help increase the effective bandwidth and associated throughput available to the UE. For instance, if a UE is attached with a base station on a first carrier, the base station may then add a second carrier to its service of the UE so as to then provide the UE with "carrier aggregation" service on a combination of the first carrier and the second carrier. In that arrangement, the first carrier may be considered the UE's primary carrier or primary cell (PCell), and the second carrier may be considered the UE's secondary carrier or secondary cell (SCell). Depending on the carrier aggregation implementation, the SCell might be used principally for downlink communication (to increase the UE's downlink throughput) rather than for uplink communication, and the PCell may carry some or all control signaling related to the SCell (in addition to control signaling related to the PCell).

Overview

When a base station provides service on multiple carriers, the difference in frequency between the carriers may result in the base station providing a different range of coverage per carrier. This stems from the fact that lower frequency signals have less path loss and thus tend to propagate farther from the base station than higher frequency signals at the same transmission power. Thus, if a base station provides service on a first carrier at a high frequency and on a second carrier at a low frequency, the base station's coverage on the first carrier will likely extend a shorter distance from the base station than the base station's coverage on the second carrier.

A specific example of this may occur with the above noted TDD and FDD carriers, due to the TDD carriers residing in the relatively high 2.5 GHz frequency band and thus having relatively high path loss, and the FDD carriers residing in the relatively low 800 MHz frequency band and thus having relatively low path loss. If a base station is configured to provide service on both such a TDD carrier and such an FDD carrier, the base station's range of coverage on the TDD carrier would thus extend a shorter distance from the base station than the base station's range of coverage on the FDD carrier, for a given level of transmission power.

Further, when a base station serves a UE on a given carrier, the base station's maximum downlink transmission power to the UE is typically higher than the UE's maximum uplink transmission power to the base station. Consequently, on the same or similar frequency (and thus with the same or similar path loss), the effective uplink coverage area between the base station the UE will typically be smaller than the effective downlink coverage area between the base station and the UE.

As a result of these differences in carrier frequency and in uplink and downlink transmission power, when a base station provides coverage on two carriers, the base station may effectively have four separate coverage borders defining areas in which the base station can engage in communication with served UEs. In particular, the base station may have separate coverage borders corresponding respectively with (i) relatively low power uplink on the higher frequency carrier, (ii) relatively high power downlink on the higher frequency carrier, (iii) relatively low power uplink on the lower frequency carrier, and (iv) relatively high power downlink on the lower frequency carrier.

FIG. 1 depicts this by way of example, in an arrangement where a base station 12 provides service on a first carrier that is at a relatively high frequency (e.g., a TDD carrier) and a second carrier that is at a relative low frequency (e.g., an FDD carrier). As shown in FIG. 1, the base station in this example effectively provides coverage extending out to (i) a first border 14 on the uplink of the first carrier, (ii) a second border 16 on the downlink of the first carrier, (iii) a third border 18 on the uplink of the second carrier, and (iv) a fourth border 20 on the downlink of the second carrier. Of course, other arrangements are possible as well. For instance, in another arrangement, the downlink of the first carrier may extend farther from the base station than the uplink of the second carrier. Moreover these effective coverage borders could change over time due to variations in load, interference, and other issues.

With an arrangement like this, one problem that can arise is that a UE served by the base station on just one of the base station's carriers may transition to a situation where the UE still has downlink coverage on that carrier but no longer has sufficient uplink coverage on that carrier. For instance, in the arrangement of FIG. 1, a UE may be served by the base station on just the first carrier while the UE is at position A, where the UE and base station can engage uplink and downlink bearer communication on the first carrier, but the UE may then move farther away from the base station and reach position B. When the UE reaches position B, the UE may then no longer be able to engage in uplink bearer communication to the base station on the first carrier, but the UE may still be able to receive downlink bearer communication from the base station on the first carrier. In practice, the base station may learn of this situation by detecting threshold low uplink signal strength from the UE on the first carrier, or by receiving a report that the UE is receiving low enough downlink signal strength on the first carrier to suggest that the UE's uplink signal strength on the first carrier would be insufficient.

In this situation, to enable the UE to continue engaging in both uplink and downlink bearer communication with the base station, the base station may invoke carrier aggregation for the UE, by adding the second carrier to the UE's service. For instance, the base station may engage in control signaling with the UE to inform the UE that the first carrier will be the UE's PCell and that the second carrier is added as an SCell for the UE. Alternatively, given the insufficiency of the UE's uplink coverage on the first carrier and given that a PCell in carrier aggregation may need to carry uplink signaling related to both the PCell and each added SCell, the base station may transition (e.g., redirect or hand over) the UE from the first carrier to the second carrier and then inform the UE that the second carrier will be the UE's PCell and that the first carrier is added as an SCell.

Through this or another process, a base station may thus transition from serving a UE on just a first carrier to serving the UE on a combination of the first carrier and a second carrier. Further, the occurrence of such a transition may indicate or be associated with the fact that the UE was at or near an edge of the base station's coverage on the first carrier and that the UE's downlink coverage on that first carrier may not be particularly optimal—e.g., that the UE may not have optimal downlink throughput on the first carrier. In addition, the fact that the base station has transitioned to serve the UE with carrier aggregation service on a combination of the first carrier and the second carrier may not entirely overcome that problem. For instance, it is possible that the first carrier may be relatively wide (e.g., a 20 MHz wide TDD carrier) and thus support relatively high peak throughput, whereas the added second carrier may be relatively narrow (e.g., a 5 or 10 MHz wide FDD carrier) and may thus support lower peak throughput. Thus, the base station's addition of the second carrier to the UE's service may not sufficiently improve the UE's downlink service.

Disclosed herein is a method and corresponding apparatus to help address such an issue. In accordance with the disclosure, when a base station transitions from serving a UE on just a first carrier to serving the UE on a combination of the first carrier and a second carrier, the base station will responsively take action to improve downlink communication to the UE on the first carrier. In particular, the base station will respond to the occurrence of that transition by starting to beamform downlink transmission to the UE on the first carrier.

When a base station operates on a particular carrier, the base station's antenna structure may normally provide a radiation pattern that generally defines a scope of coverage in which the base station can engage in downlink communication to UEs. To facilitate the present method, however, the base station may also be configured to selectively beamform (i.e., focus) downlink transmission on that carrier to particular UEs. To beamform transmission to a UE, for instance, the base station may receive from the UE certain uplink control signaling that carries or embodies particular information regarding the path of transmission from the UE (such as phase information, precoding matrix information, or the like), and the base station may use that information in as a basis to dynamically direct downlink transmission in the reverse direction, i.e., with a beam directed to the UE's location. Other beamforming mechanisms may be also possible.

Thus, in accordance with the present disclosure, the base station may initially serve the UE on just a first carrier without beamforming (i.e., just using the base station's general downlink radiation pattern on the first carrier and not beamforming downlink transmission to the UE) and may then transition from serving the UE on the first carrier to serving the UE on a combination of the first carrier and a second carrier. And in response to that transition, the base station may then invoke downlink beamforming to the UE on the first carrier, so as to help improve downlink communication to the UE on the first carrier and perhaps to improve or provide a more consistent user experience.

Accordingly, in one respect, disclosed is method for controlling wireless communication between a base station and a UE served by the base station. According to the method, the base station serves the UE on just a first carrier, the base station then transitions from serving the UE on just the first carrier to serving the UE on a combination of the first carrier and a second carrier, and, responsive to at least that transitioning, the base station starts to apply beamforming to the UE on the first carrier.

Further, in another respect, the disclosed method may involve the base station serving the UE on just a TDD carrier in a first frequency band, including providing downlink transmission to the UE on the TDD carrier and not beamforming the downlink transmission. In turn, the method may involve the base station transitioning from serving the UE on just the TDD carrier in the first frequency band to providing the UE with carrier aggregation service on a combination of the TDD carrier in the first frequency band and an FDD carrier in a second frequency band, with the FDD carrier being a primary component carrier of the carrier aggregation service and the TDD carrier being a secondary component carrier of the carrier aggregation service, and the second frequency band being lower in frequency than the first frequency band. Further, the method may then involve, responsive to at least the transitioning from serving the UE on just the TDD carrier in the first frequency band to providing the UE with carrier aggregation service on a combination of the TDD carrier in the first frequency band and the FDD carrier in the second, lower frequency band, the base station starting to beamform downlink transmission to the UE on the TDD carrier.

And still further, in another respect, disclosed is a base station configured to control wireless communication between the base station and a UE served by the base station in the above or similar ways. As disclosed, for instance, the base station may comprise a wireless communication interface having an antenna structure, that is operable to provide downlink transmission to the UE and to receive uplink transmission from the UE. And the base station may comprise a controller that is operable to control the downlink transmission from the base station the UE on a first carrier. In line with the discussion above, the controller may thus cause the base station to carry out operations comprising (i) serving the UE on just the first carrier and without beamforming of downlink transmission from the base station to the UE on the first carrier, (ii) transitioning from serving the UE on just the first carrier to serving the UE on a combination of the first carrier and a second carrier and (iii) responsive to at least the transitioning, starting to beamform downlink transmission to the UE on the first carrier.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and system will be described herein in the context of LTE, and with the first carrier being a TDD carrier in the 2.5 GHz band and the second carrier being an FDD carrier in the 800 MHz band. However, it will be understood that principles of the disclosure can extend to apply in other scenarios as well, such as with respect to other air interface protocols and other carriers. Further, even within the context of LTE and with the example carriers, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 2:
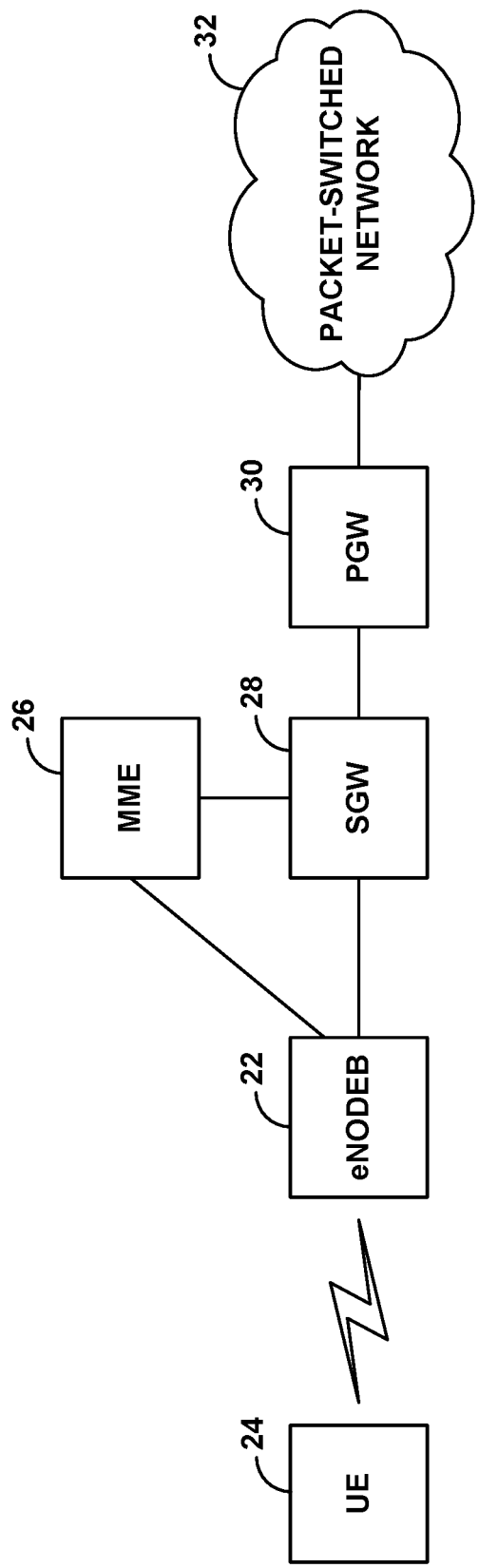
FIG. 2 is a simplified block diagram of an example wireless communication system in which embodiments of the present disclosure can be implemented.

Referring to the drawings, as noted above, FIG. 2 is a simplified block diagram of an example wireless communication system in which the present method can be implemented. In particular, FIG. 2 depicts a representative LTE network, which functions primarily to serve UEs with wireless packet data communication service, including possibly voice over Internet Protocol (VoIP) service, but may also provide other functions. As shown, the LTE network includes a representative LTE base station 22 known as an evolved Node B (eNodeB). The eNodeB has an antenna structure (e.g., patch, dipole, phased array, and/or other antenna arrangement) and associated equipment for providing LTE coverage in which to serve UEs such as an example UE 24.

In line with the discussion above, the eNodeB may be configured with one or more radios to provide service on multiple carriers, each of which might be in the same or a different band in the radio frequency spectrum, and the eNodeB may operate with higher transmission power than the UE, so that there may be multiple effective coverage borders at varying distances from the eNodeB. By way of example, as noted above, the eNodeB may be configured to provide service on a TDD carrier in the 2.5 GHz band and an FDD carrier in the 800 MHz band.

In the example system eNodeB 22 has a communication interface with a mobility management entity (MME) 26, which may function as a signaling controller for the LTE network. Further, eNodeB 22 has a communication interface with a serving gateway (SGW) 28, which in turn has a communication interface with a packet-data network gateway (PGW) 30 that provides connectivity with a packet-switched network 32, and the MME 26 has a communication interface with the SGW 28. In practice, each of these entities may sit on a core packet network operated by a wireless service provider, and the communication interfaces between these entities may be logical packet-switched interfaces. Other arrangements are possible as well.

Figure 3:
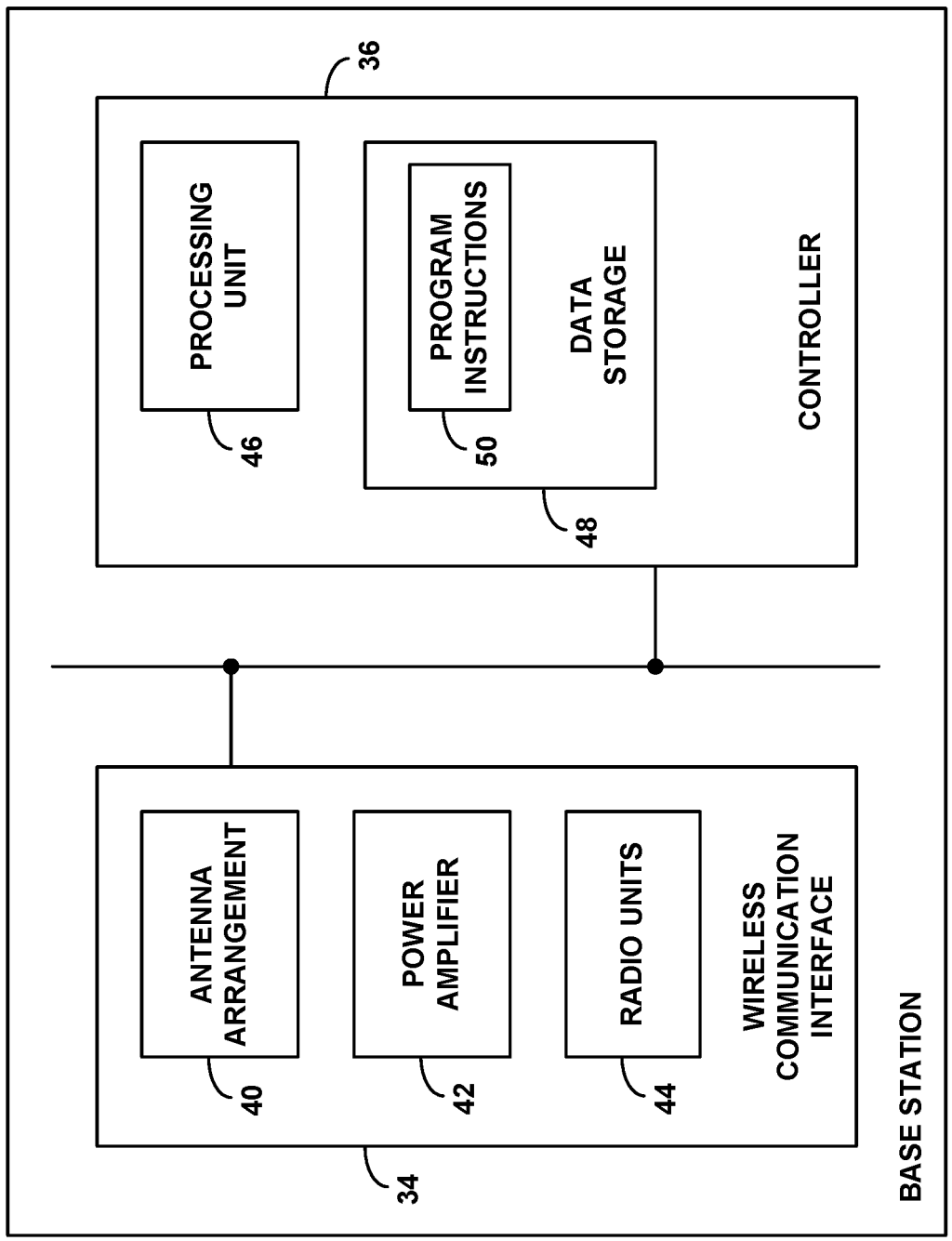
FIG. 3 is a simplified block diagram of an example base station operable to implement embodiments of the present disclosure.

FIG. 3 is next a simplified block diagram of a representative base station such as eNodeB 22, depicting some of the components that can be included in such an entity. Generally, this base station could take various forms, such as a macro base station having a tall antenna tower and power amplifier to provide a wide range of coverage, or a small base station (such as a picocell, femtocell, small cell, mini macro base station, relay base station, mobile hotspot, or the like), having a smaller form factor and lower power and thus providing a relatively smaller range of coverage. As shown in FIG. 3, the representative base station may include, among other elements, a wireless communication interface 34 and a controller 36, which may be integrated together or communicatively linked together by a system bus, network, or other connection mechanism 38.

As shown, wireless communication interface 34 may include an antenna arrangement 40, which may be tower mounted or provided in another form, and associated components such as a power amplifier 42 and one or more radio units 44 for engaging in air interface communication with UEs via the antenna arrangement 40, so as to transmit bearer data and control signaling to the UEs and to receive bearer data and control signaling from the UEs. In the example arrangement, the radio unit(s) would be configured to engage in communication via the antenna arrangement on each of multiple carriers, such as the representative TDD and FDD carriers and perhaps others. In general, the eNodeB may thus generally provide a radiation pattern respectively on each carrier, with the eNodeB's FDD coverage likely extending farther from the base station than the TDD coverage as discussed above, because the FDD carrier is in a substantially lower frequency band (with less path loss) than the TDD carrier.

Controller 36 may then include a processing unit 46 (e.g., one or more general purpose and/or special purpose processors) and non-transitory data storage 48 (e.g., one or more volatile and/or non-volatile storage components such as magnetic, optical, flash or other storage, possibly integrated in whole or in part with the processing unit). And data storage 48 may hold (e.g., have encoded thereon) program instructions 50, which may be executable by processing unit 46 to carry out or cause to be carried out various base station operations described herein. Although the controller 36 is shown within the base station, some or all of the control functionality could alternatively be provided external to the base station, such as by another entity in the network.

In practice, when UE 24 enters into coverage of eNodeB 22, the UE may detect coverage of the eNodeB 22 on a particular carrier, such as the eNodeB's TDD carrier, and the UE and eNodeB may then engage in control signaling to establish a radio resource configuration (RRC) connection on that carrier between the UE and the eNodeB. Further, the UE and the eNodeB may engage in an attach process through which the network establishes for the UE a bearer connection between the UE and the PGW via the eNodeB and SGW, and through which the eNodeB establishes for the UE a context record indicating that the eNodeB is serving the UE on the carrier. In particular, the context record may indicate that the UE's RRC connection encompasses just that one carrier, designating the carrier by a global carrier index number for instance. Further, the UE may also establish a context record indicating the carrier on which the UE is being served by the eNodeB.

When the UE is so attached with the eNodeB and served on the carrier, the UE may regularly measure downlink signal strength from the eNodeB on the carrier and may transmit channel state report signaling to the eNodeB so as to inform the eNodeB of the UE's channel conditions. Further, the UE may regularly transmit an uplink reference signal that the eNodeB may monitor to help further appreciate the UE's channel conditions.

When the eNodeB has bearer data to transmit to the UE on the UE's served carrier, the eNodeB may transmit on a downlink control channel to the UE a downlink control information (DCI) message indicating certain radio resources (e.g., physical resource blocks) of a downlink shared channel on which the eNodeB is transmitting the data to the UE, and the eNodeB may transmit the data in the indicated radio resources using a modulation and coding scheme (and thus data rate) suitable for the UE's current channel conditions, for receipt by the UE. Similarly, when the UE has bearer data to transmit to the eNodeB, the UE may transmit a scheduling request or the like on an uplink control channel to the eNodeB, and the eNodeB may then transmit to the UE a DCI message indicating certain radio resources of an uplink shared channel on which the UE should transmit the data to the eNodeB, and the UE may then transmit the data in the indicated radio resources using a suitable modulation and coding scheme, for receipt by the eNodeB.

When the eNodeB is serving the UE on just the first carrier, the eNodeB may be doing so without downlink beamforming to the UE. Thus, downlink transmissions from the eNodeB to the UE may be provided generally in accordance with the eNodeB's downlink radiation pattern rather than being focused specifically in the direction of the UE.

Figure 1:
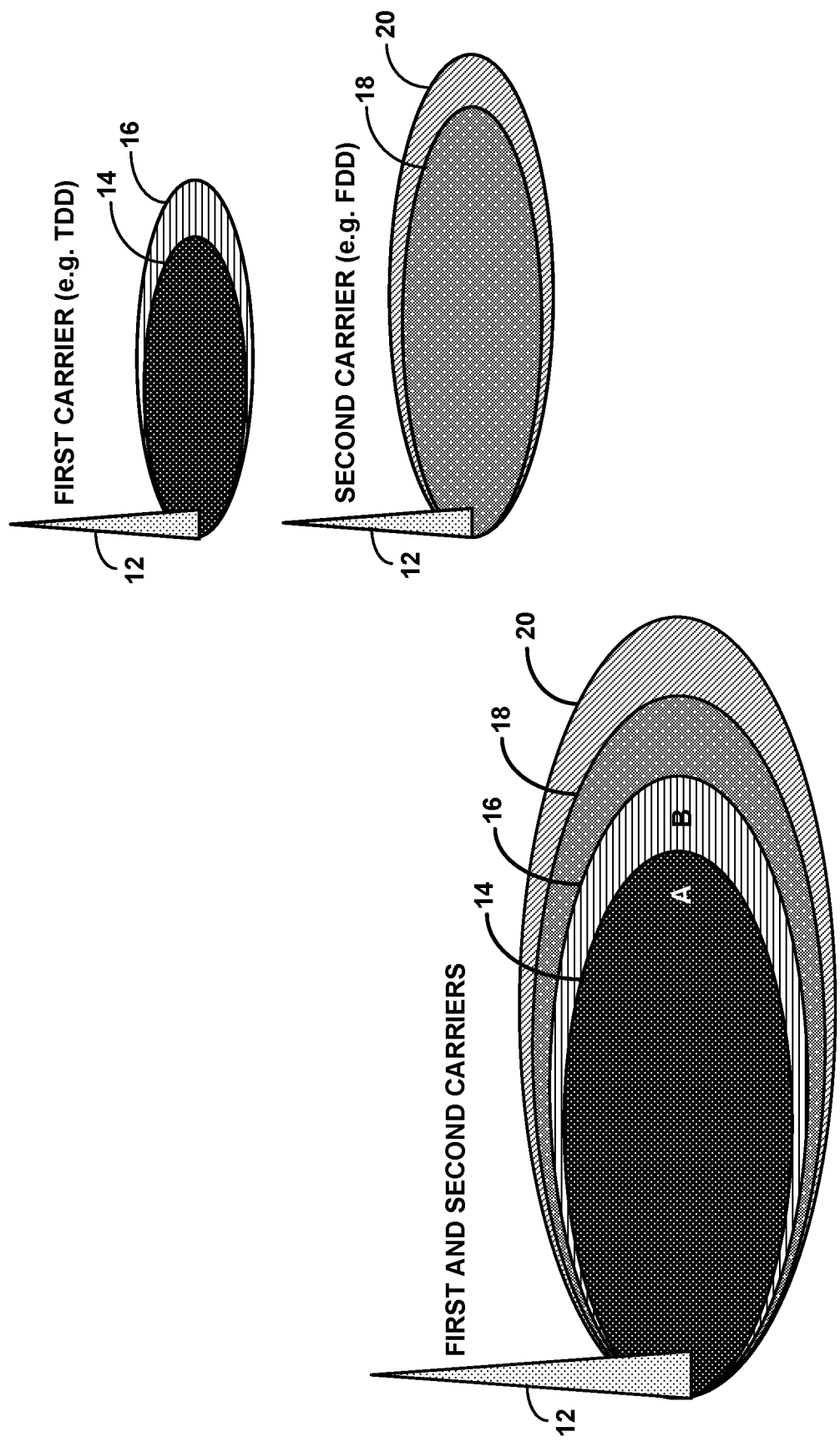
FIG. 1 is an illustration of example coverage borders provided for uplink and downlink service on multiple carriers.

In a situation such as that depicted in FIG. 1 and discussed above, when the eNodeB is serving the UE on just a single carrier like this, the eNodeB may then transition to begin serving the UE with carrier aggregation on a combination of the first carrier and a second carrier, such as the eNodeB's FDD carrier for instance. To do so, as discussed above, the eNodeB may transition the UE from the first carrier to the second carrier and may designate the second carrier as the UE's PCell and the first carrier as an SCell for the UE. For instance, the eNodeB may transmit RRC reconfiguration signaling to the UE to redirect or hand over the UE to the second carrier and to designate the second carrier by a carrier index number that the UE interprets to mean the second carrier is a PCell and to designate the first carrier by a carrier index number that the UE interprets to mean that the first carrier is an SCell. The eNodeB may then provide the UE with carrier aggregation service on these two carriers (possibly including one or more others as well). Further, the eNodeB may update its context record for the UE to indicate the carriers on which the eNodeB is now serving the UE, and the UE may similarly update its records.

With such carrier aggregation service, the UE may regularly monitor signal strength of each carrier and transmit channel state reports for both carriers on a control channel of the PCell or alternatively on an uplink of each respective carrier. Further, the eNodeB may schedule concurrent bearer communication with the UE on both carriers to help provide the UE with improved throughput, transmitting DCI messaging to the UE on a downlink control channel of the PCell or alternatively on downlink control channels of each respective carrier. The eNodeB may, however, limit such scheduled communications in view of coverage available. For instance, given that the UE's uplink coverage on the first carrier is threshold poor, the eNodeB may avoid scheduling uplink bearer communication with the UE on the first carrier. But the eNodeB may schedule uplink bearer communication with the UE on the second carrier, and the eNodeB may schedule uplink and downlink bearer communication with the UE on the second carrier.

As discussed above, per the present disclosure, the eNodeB may invoke beamforming on the first carrier in response to the eNodeB transitioning from serving the UE on just a first carrier to serving the UE on a combination of the first carrier and a second carrier. This responsive action could occur during or after the transition occurs, or perhaps even before the transition occurs but in response to determining that the transition is going to occur (which could be considered still responding to the transition).

In line with the discussion above, to begin beamforming to the UE on the first carrier, the eNodeB may use uplink control signaling as a basis to direct transmission on the first carrier to the UE. By way of example, the UE could transmit an uplink reference signal on the first carrier (which may reach the eNodeB, even though the first carrier uplink might be insufficient to successfully carrier bearer data to the eNodeB), and the eNodeB may use phase information or the like from that signal as a basis to set phases and other attributes of downlink transmission to the UE on the first carrier so as to focus an antenna path in the direction of the UE. Alternatively, the UE could transmit precoding matrix information or the like in a control signal on the first carrier or the second carrier, which the eNodeB could use as a basis to beamform to the UE on the first carrier. Still alternatively, the eNodeB could use an uplink reference signal from the UE on the second carrier as a basis to determine a direction for focused transmission to the UE, and the eNodeB could apply that determination on the first carrier. And yet alternatively, the eNodeB might be able to use geo-location of the UE as a basis to direct transmission to the UE on the first carrier. Advantageously, this beamforming may thus improve downlink service to the UE on the first carrier.

Note that in an example arrangement such as that depicted in FIG. 1, the eNodeB may limit this process to UEs that are just within the area between the first border 14 and the second border 16, i.e. where the first carrier provides sufficient downlink but insufficient uplink and where the second carrier provides sufficient uplink and downlink. Alternatively or additionally, the eNodeB could so limit this process only if the eNodeB is currently beamforming to more than a predefined threshold number of UEs on the first carrier (given processing limitations at the eNodeB).

Figure 4:
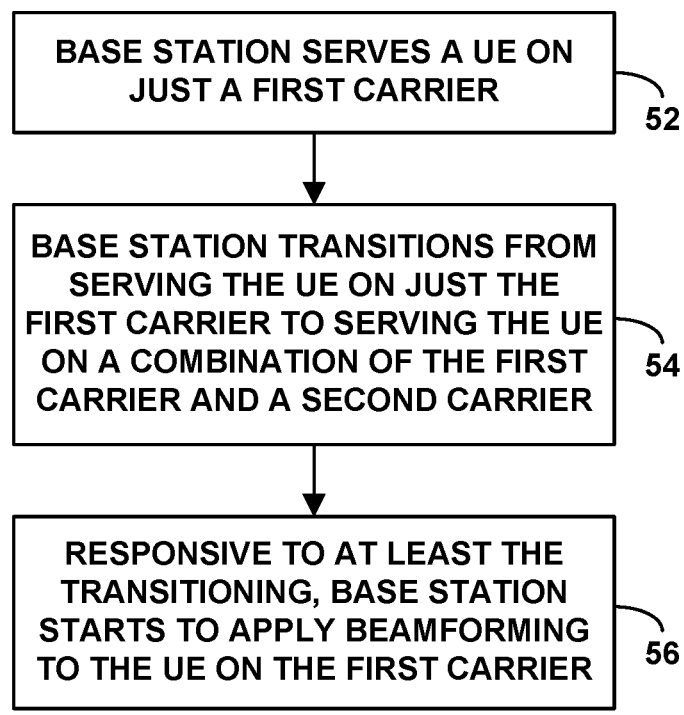
FIG. 4 is a flow chart depicting an example method in accordance with the present disclosure.

FIG. 4 is next a flow chart depicting example operations of a method that could be carried out by a base station in accordance with the present disclosure, to control wireless communications between the base station a UE served by the base station. As shown in FIG. 4, at block 52, the method involves the base station serving the UE on just a first carrier. In turn, at block 54, the method involves the base station transitioning from serving the UE on just the first carrier to serving the UE on a combination of the first carrier and a second carrier. And at block 56, the method involves, responsive to at least the transitioning, the base station starting to apply beamforming to the UE on the first carrier.

In this method, the first and second carriers can take various forms, and details of the transitioning and beamforming may vary as well.

By way of example, the first carrier could be a TDD carrier, the second carrier could be an FDD carrier, and the act of serving the UE on the combination of the TDD carrier and the FDD carrier may involve providing the UE with carrier aggregation service with the FDD carrier being a primary component carrier and the TDD carrier being a secondary component carrier. Further, the act of starting to apply beamforming to the UE on the first carrier could be additionally responsive to the fact that the transitioning is from serving the UE on jus the TDD carrier to serving the UE on a combination of the TDD carrier and the FDD carrier (i.e., not just to the fact of the transition but also to the fact that those are the carriers involved in the transition).

As another example, or phrased in another way, the first carrier could occupy a first frequency bandwidth, the second carrier could occupy a second frequency bandwidth that is lower in frequency than the first frequency bandwidth, and the act of starting to apply beamforming could be additionally responsive to the second frequency bandwidth of the second carrier is lower in frequency than the first frequency bandwidth of the first carrier. And alternatively or additionally, the first carrier could occupy a first frequency bandwidth, the second carrier could occupy a second frequency bandwidth that is narrower in frequency than the first frequency bandwidth, and the act of starting to apply beamforming could be additionally responsive to the second frequency bandwidth of the second carrier being narrower in frequency than the first frequency bandwidth of the first carrier.

Further, in these or other arrangements, the act of transitioning the UE from being served on just the first carrier to being served on a combination of the first carrier and the second carrier could involve (i) handing over the UE from service on the first carrier to service on the second carrier and (ii) adding the first carrier to service of the UE as a secondary carrier, with the base station then engaging in downlink bearer communication with the UE on both the first carrier and the second carrier and engaging in uplink bearer communication with the UE on just the second carrier (i.e., using the first carrier as a secondary carrier for carrying bearer data from the base station to the UE).

Further in line with the discussion above, before the transitioning occurs, the base station may not be applying beamforming of downlink transmission to the UE on the first carrier, and the act of starting to apply beamforming to the UE on the first carrier may involve the base station starting to beamform downlink transmission to the UE on the first carrier. For instance, the base station may start to use uplink signaling from the UE as a basis to beamform downlink transmission to the UE on the first carrier. Moreover, before the transitioning occurs, the base station may be serving the UE with uplink bearer communication on the first carrier and downlink bearer communication on the first carrier, and the transitioning may then involve the base station discontinuing serving of the UE with uplink bearer communication on the first carrier and instead serving the UE with uplink bearer communication on the second carrier, and perhaps serving the UE with downlink bearer communication on both.

Figure 5:
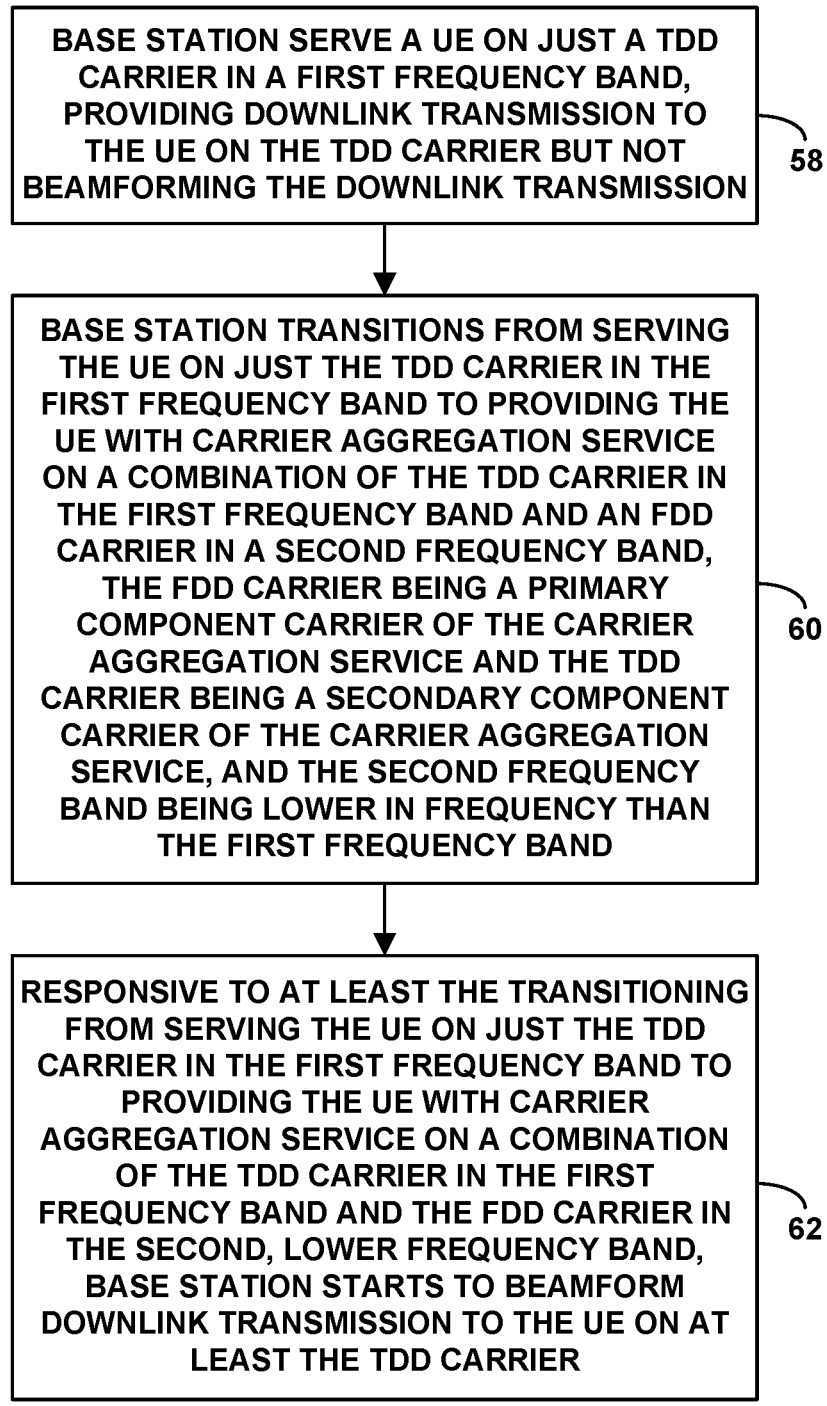
FIG. 5 is a flow chart depicting another example method in accordance with the present disclosure.

FIG. 5 is next another flow chart depicting example operations of a method that could be carried out by a base station in accordance with the present disclosure, to control wireless communications between the base station a UE served by the base station. As shown in FIG. 6, at block 58, the method involves the base station serving the UE on just a TDD carrier in a first frequency band, wherein the base station provides downlink transmission to the UE on the TDD carrier and does not beamform the downlink transmission. In turn, at block 60, the method involves the base station transitioning from serving the UE on just the TDD carrier in the first frequency band to providing the UE with carrier aggregation service on a combination of the TDD carrier in the first frequency band and an FDD carrier in a second frequency band, with the FDD carrier being a primary component carrier of the carrier aggregation service and the TDD carrier being a secondary component carrier of the carrier aggregation service, and with the second frequency band being lower in frequency than the first frequency band. And at block 62, the method involves, responsive to at least the transitioning from serving the UE on just the TDD carrier in the first frequency band to providing the UE with carrier aggregation service on a combination of the TDD carrier in the first frequency band and the FDD carrier in the second, lower frequency band, the base station starting to beamform downlink transmission to the UE on at least the TDD carrier, such as beginning to use uplink signaling from the UE as a basis to direct the downlink bearer communication to a location of the UE.

Exemplary embodiments have been described above. Those skilled in the art will understand, however, that changes and modifications may be made to these embodiments without departing from the true scope and spirit of the invention.

We claim:

1. A method for controlling wireless communication between a base station and a user equipment device (UE) served by the base station, the method comprising:

the base station serving the UE on just a first carrier;

the base station transitioning from serving the UE on just the first carrier to serving the UE on a combination of the first carrier and a second carrier, wherein transitioning to serve the UE on the combination of the first carrier and the second carrier comprises handing over the UE from service on the first carrier to service on the second carrier and designating the second carrier as a primary carrier of the UE and the first carrier as a secondary carrier of the UE, wherein the base station then schedules concurrent bearer communication with the UE on the first carrier and the second carrier; and responsive to at least the transitioning, the base station starting to apply beamforming to the UE on the first carrier, wherein starting to apply beamforming to the UE on the first carrier comprises starting to use uplink signaling from the UE as a basis to beamform downlink transmission to the UE on the first carrier.

2. The method of claim 1, wherein the first carrier occupies a first frequency bandwidth, wherein the second carrier occupies a second frequency bandwidth that is lower in frequency than the first frequency bandwidth, and wherein starting to apply beamforming is further responsive to the second frequency bandwidth of the second carrier being lower in frequency than the first frequency bandwidth of the first carrier.

3. The method of claim 1, wherein the first carrier occupies a first frequency bandwidth, wherein the second carrier occupies a second frequency bandwidth that is narrower in frequency than the first frequency bandwidth, and wherein starting to apply beamforming is further responsive to the second frequency bandwidth of the second carrier being narrower in frequency than the first frequency bandwidth of the first carrier.

4. The method of claim 1, wherein before the transitioning, the base station does not beamform downlink transmission to the UE on the first carrier, and wherein starting to apply beamforming to the UE on the first carrier comprises starting to beamform downlink transmission to the UE on the first carrier.

5. The method of claim 1, wherein before the transitioning, the base station serves the UE with uplink bearer communication on the first carrier and downlink bearer communication on the first carrier, and wherein the transitioning comprises discontinuing serving of the UE with uplink bearer communication on the first carrier and instead serving the UE with uplink bearer communication on the second carrier.

6. A base station configured to control wireless communication between the base station and a user equipment device (UE) served by the base station, the base station comprising:

a wireless communication interface including an antenna structure, operable to provide downlink transmission to the UE and to receive uplink transmission from the UE; and a controller operable to control the downlink transmission from the base station the UE on a first carrier, wherein the controller is operable to cause the base station to carry out operations comprising (i) serving the UE on just the first carrier and without beamforming of downlink transmission from the base station to the UE on the first carrier, (ii) transitioning from serving the UE on just the first carrier to serving the UE on a combination of the first carrier and a second carrier and (iii) responsive to at least the transitioning, starting to beamform downlink transmission to the UE on the first carrier, wherein starting to beamform downlink transmission to the UE on the first carrier comprises starting to use uplink signaling from the UE as a basis to beamform the downlink transmission to the UE on the first carrier, wherein transitioning from serving the UE on just the first carrier to serving the UE on the combination of the first carrier and the second carrier comprises handing over the UE from service on the first carrier to service on the second carrier and designating the second carrier as a primary carrier of the UE and the first carrier as a secondary carrier of the UE, wherein the base station then schedules concurrent bearer communication with the UE on the first carrier and the second carrier.

7. The base station of claim 6, wherein the controller comprises a processing unit, non-transitory data storage, and program instructions stored in the data storage and executable by the processing unit to cause the base station to carry out the operations.

8. The base station of claim 6, wherein the first carrier occupies a first frequency bandwidth, wherein the second carrier occupies a second frequency bandwidth that is lower in frequency than the first frequency bandwidth, and wherein starting to beamform downlink transmission to the UE on the first carrier is further responsive to the second frequency bandwidth of the second carrier being lower in frequency than the first frequency bandwidth of the first carrier.

9. The base station of claim 6, wherein the first carrier occupies a first frequency bandwidth, wherein the second carrier occupies a second frequency bandwidth that is narrower in frequency than the first frequency bandwidth, and wherein starting to beamform downlink transmission to the UE on the first carrier is further responsive to the second frequency bandwidth of the second carrier being narrower in frequency than the first frequency bandwidth of the first carrier.

10. The base station of claim 6, wherein before the transitioning, the base station serves the UE with uplink bearer communication on the first carrier and downlink bearer communication on the first carrier, and wherein the transitioning comprises discontinuing serving of the UE with uplink bearer communication on the first carrier and instead serving the UE with uplink bearer communication on the second carrier.

11. A method comprising:

transitioning by a base station from serving a user equipment device (UE) on just a first carrier to serving the UE on a combination of the first carrier and a second carrier, wherein the transitioning includes designating the second carrier as a primary carrier for carrier-aggregation service of the UE and the first carrier as a secondary carrier for the carrier-aggregation service of the UE, whereby the base station then schedules concurrent bearer communication with the UE on the first carrier and the second carrier; and responsive to at least the transitioning, starting to beamform downlink transmission to the UE on the first carrier, wherein starting to apply beamforming to the UE on the first carrier comprises starting to use uplink signaling from the UE as a basis to beamform downlink transmission to the UE on the first carrier.

12. The method of claim 11, wherein the first carrier occupies a first frequency bandwidth, wherein the second carrier occupies a second frequency bandwidth that is lower in frequency than the first frequency bandwidth, and wherein starting to beamform downlink transmission to the UE on the first carrier is further responsive to the second frequency bandwidth of the second carrier being lower in frequency than the first frequency bandwidth of the first carrier.

13. The method of claim 11, wherein the first carrier occupies a first frequency bandwidth, wherein the second carrier occupies a second frequency bandwidth that is narrower in frequency than the first frequency bandwidth, and wherein starting to beamform downlink transmission to the UE on the first carrier is further responsive to the second frequency bandwidth of the second carrier being narrower in frequency than the first frequency bandwidth of the first carrier.

14. The method of claim 11, wherein before the transitioning, the base station does not beamform downlink transmission to the UE on the first carrier.

15. The method of claim 11, wherein before the transitioning, the base station serves the UE with uplink bearer communication on the first carrier and downlink bearer communication on the first carrier, and wherein the transitioning comprises discontinuing serving of the UE with uplink bearer communication on the first carrier and instead serving the UE with uplink bearer communication on the second carrier.

* * * * *